Aug. 22, 1933.　　　L. E. McDONOUGH　　　1,923,158
PLAITING MACHINE
Filed Feb. 1, 1930　　　7 Sheets-Sheet 1

Aug. 22, 1933.  L. E. McDONOUGH  1,923,158
PLAITING MACHINE
Filed Feb. 1, 1930  7 Sheets-Sheet 2

Inventor.
Lawrence E. McDonough
by [signature]
his Attorneys.

Aug. 22, 1933.　　　　L. E. McDONOUGH　　　　1,923,158
PLAITING MACHINE
Filed Feb. 1, 1930　　　7 Sheets-Sheet 4

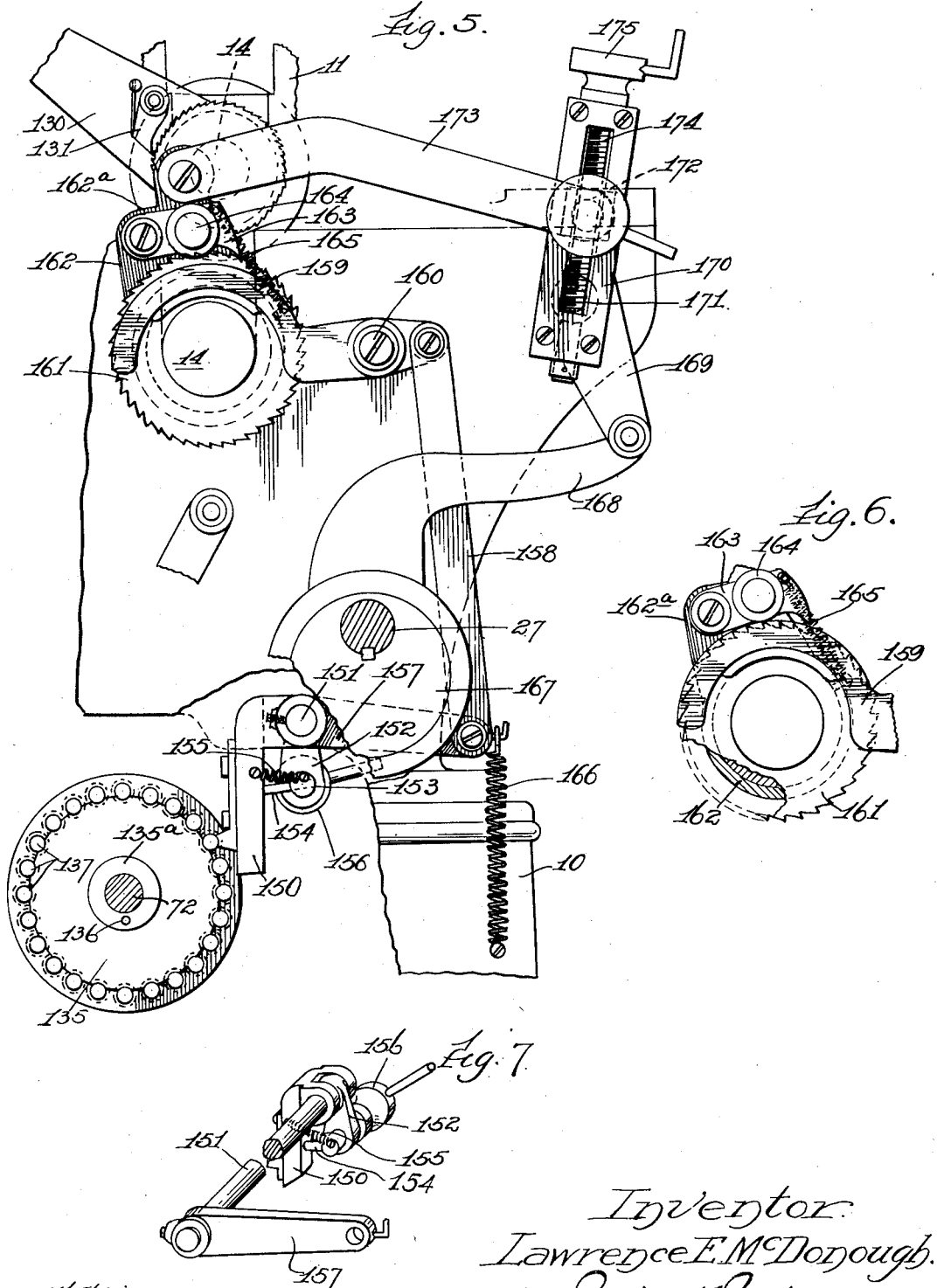

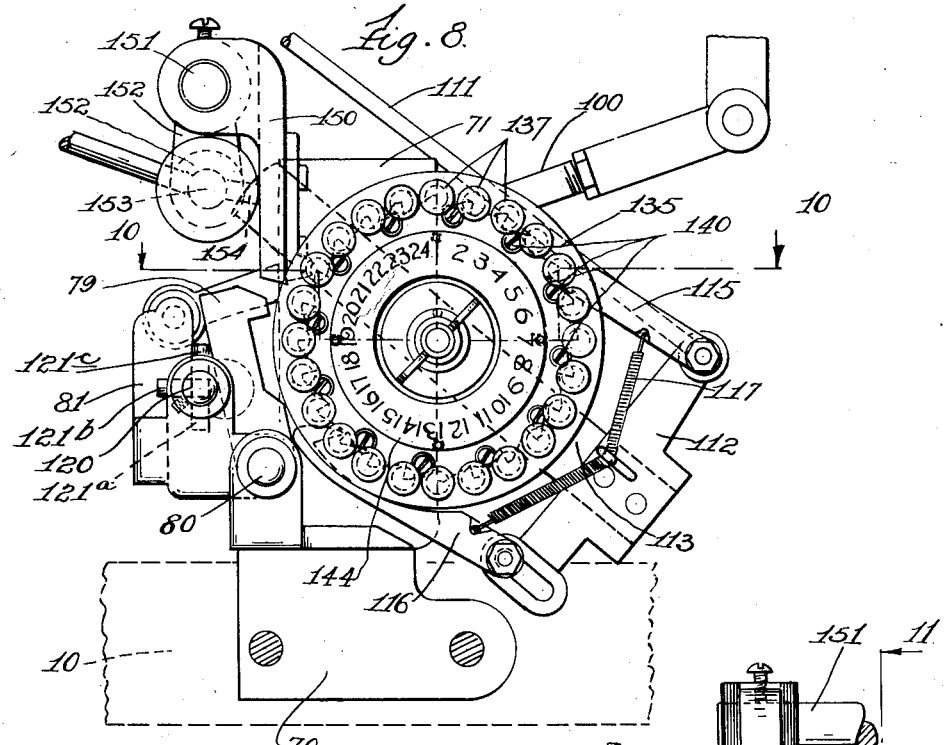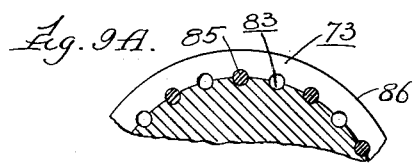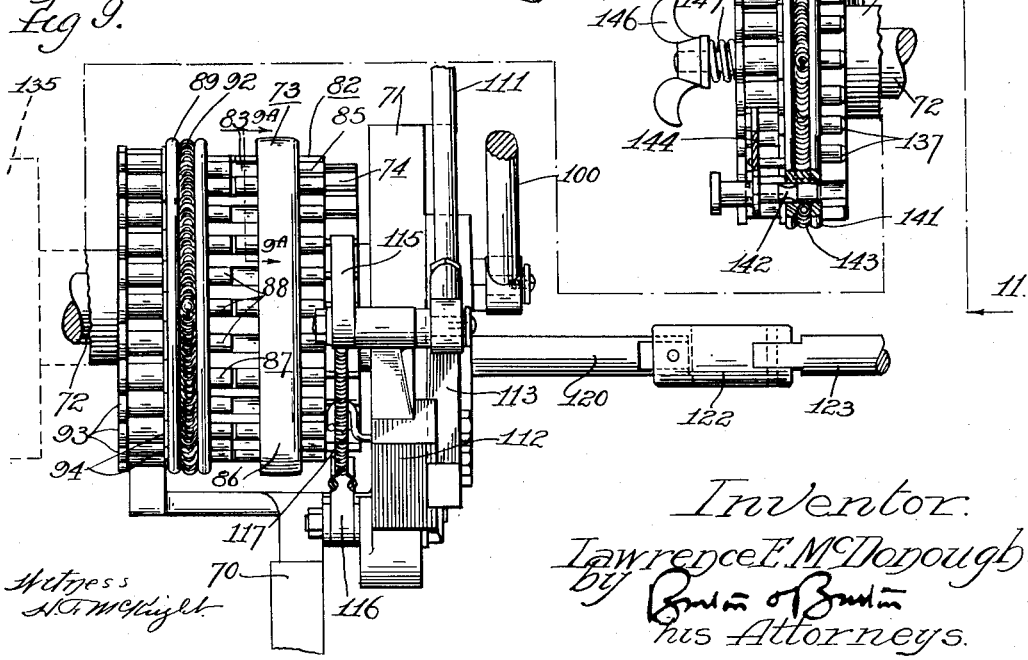

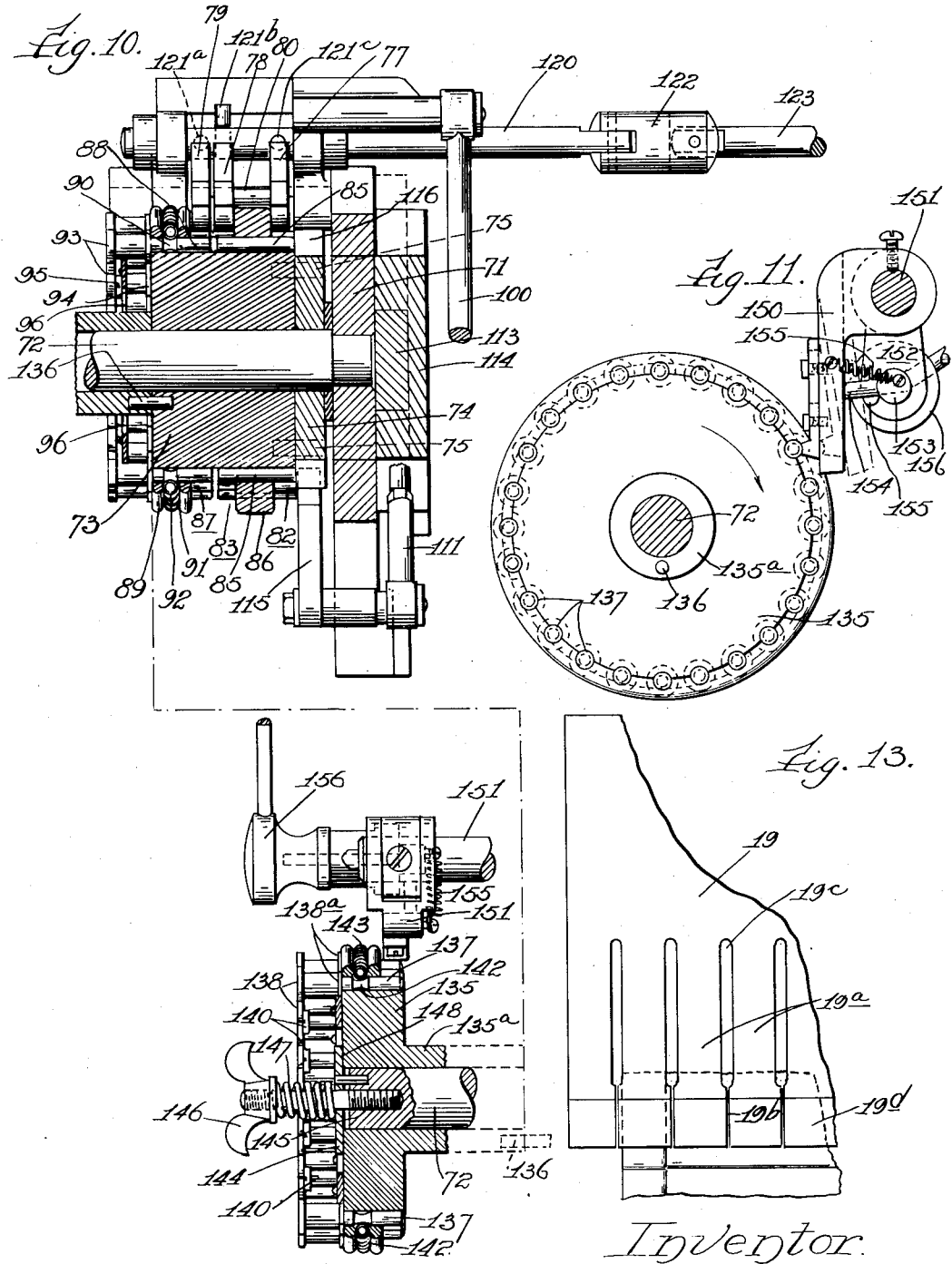

Patented Aug. 22, 1933

1,923,158

UNITED STATES PATENT OFFICE 1,923,158

PLAITING MACHINE

Lawrence E. McDonough, Chicago, Ill.

Application February 1, 1930. Serial No. 425,140

13 Claims. (Cl. 223—44)

This invention has reference to plaiting machines of the type having means for advancing the cloth or fabric in looped form into the bight of a pair of cooperating pressure rolls for creasing it to form plaits, and more particularly the present invention is concerned with machines of the type adapted for making "side" plaits, "reverse" plaits, "box" plaits, or "combination" plaits; the general purpose of the invention resides in the provision of an improved machine of this general character which is durable, simple in construction and manipulation and capable of efficiently and accurately producing these various styles of plaits in different sizes and combinations.

Another object of this invention is to provide in a machine of this character, improved controlling means, selectively adjustable at will for producing "side" plaits, "reverse" plaits, "box" plaits and "combination" plaits, and capable of being readily altered for changing from one form of plait to another. Another object of this invention resides in the provision of selectively adjustable means for automatically spacing the plaits in a predetermined arrangement and also constructed for adjustment for varying the distance between plaits. A further object is to provide an improved paper rack arranged for supporting a plurality of rolls of paper, constructed to permit quick and easy manipulation for bringing any selected roll of paper into operative position. A still further object of this invention is to provide an improved mounting for the pressure rolls by reason of which the rolls may be adjusted for varying the relation of their axes for insuring accurate plaiting of cloth or fabric of different thickness.

Still another object of this invention resides in the provision of improved cloth-gripping members or knives having yielding portions for accommodating excess thickness in the cloth at certain points, (such as a hem), while insuring a firm grip of the cloth over the remaining width thereof. The invention consists in certain features and elements of construction in combination, as herein shown and described, and as indicated by the claims.

In the drawings:

Figure 5 is an enlarged fragmentary view showing certain parts of the machine, including mechanism for automatically speeding the feed of the pressure rolls at certain predetermined intervals.

Figure 6 is a fragmentary view of a portion of the automatic spacer mechanism showing the cam track in raised position holding the ratchet pawl out of contact with the ratchet.

Figure 7 is a fragmentary perspective view illustrating parts of the mechanism for transmitting motion to the cam track.

Figure 8 is a view in end elevation of the combined selector mechanism for controlling the formation of various types of plaits, and also the means for controlling the automatic spacing mechanism.

Figure 9 is a plan view of the mechanism shown in Figure 8; the view being broken for convenience of arrangement; Figure 9A is a fragmentary view taken at line 9A—9A on Figure 9.

Figure 10 is a horizontal sectional view through the combined control mechanism taken substantially as indicated at line 10—10 on Figure 8.

Figure 11 is a fragmentary view of the control means for the automatic spacing mechanism taken substantially as indicated at line 11—11 on Figure 9.

Figure 12 is a sectional view through the control wheel by means of which the control mechanism is selectively adjustable at will, and taken substantially as indicated at line 12—12 on Figure 1.

Figure 13 is a fragmentary plan view of the cloth-gripping members or knives shown with a piece of cloth or fabric associated therewith.

Figure 14 is a fragmentary view looking toward the gripping edge of the cloth-gripping members or knives, showing them engaging a piece of cloth or fabric with a pair of the yielding fingers sprung apart to accommodate a hem formed in the cloth.

Figure 15 is a sectional detail view of a rock shaft and control handle for adjusting the upper pressure roll relative to the lower pressure roll.

Figure 16 is a view in perspective of the paper rack arranged for supporting a plurality of rolls of paper, capable of adjustment for bringing any selected roll into operative position.

Figure 17 is a fragmentary sectional view of the detent or locking means for securing the paper rack with the rolls in any selected position of adjustment.

The plaiting machine embodying the present invention functions in the main similarly to the machines disclosed in my co-pending applications, Serial No. 328,476 and No. 356,755, filed December 26, 1928 and April 20, 1929, respectively; and it is to be understood that this application is a continuation in part of my last mentioned co-pending application.

Although the present invention employs a considerable portion of the general structure disclosed in said applications, it will be apparent that the present invention represents certain novel refinements of the features and mechanism shown therein, with the addition of certain other novel mechanism for accomplishing results heretofore unattainable.

Figure 3:
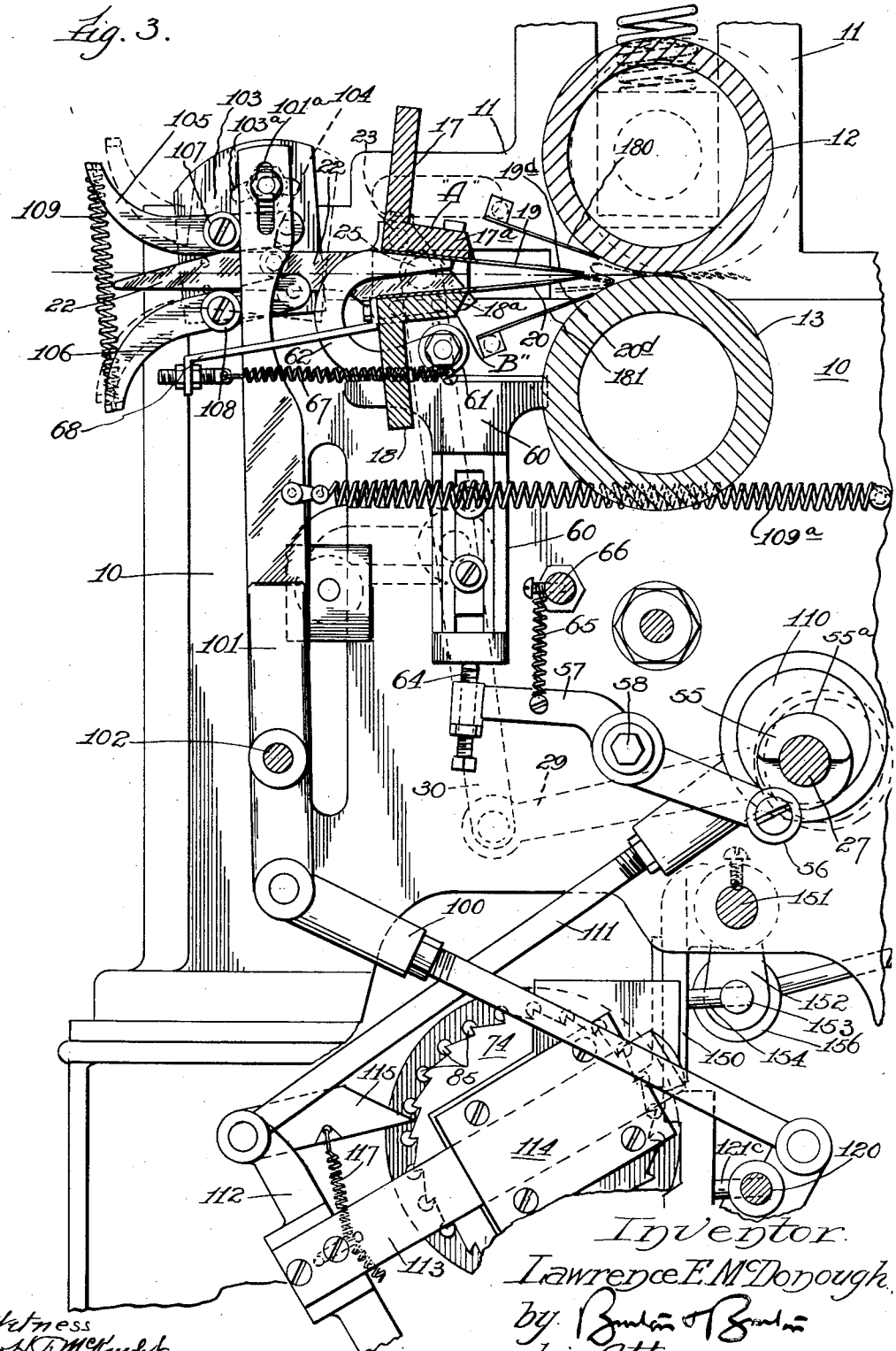
Figure 3 is an enlarged sectional view through the machine taken adjacent one end showing the cloth-gripping members in position for forming side plaits.

Referring now in particular to the drawings, the machine is provided with a pair of standards or end frames, 10, the upper ends of which are formed to provide sliding engagement for a pair of supplemental supporting frames indicated at 11, the latter being in substantially the same plane as the main standards. A pair of vertically spaced cooperating pressure rolls, 12 and 13, are journaled in the respective frame members, 10 and 11, as seen in Figure 3 of the drawings. It may be understood that these rolls are of conventional design and are provided at their outer ends with trunnions, 14, which serve to support said rolls, the trunnions at one end being of sufficient length to accommodate a pair of intermeshing gears, 15, 15, by means of which one of the rolls is driven by the other.

Positioned for cooperation with the rolls are a pair of horizontally reciprocable cloth-gripping members or knives indicated generally at A and B, which are adapted for advancing the cloth in looped form into the bight of the rolls for creasing it to form plaits. These cloth-gripping members include frame members, 17 and 18, respectively, formed with supporting legs, 17ª and 18ª extending forwardly and slightly oblique to each other, to which extensions are rigidly secured relatively thin plates or knives, 19 and 20, which are dimensioned so that in one position they taper toward each other with their outer edges meeting in line contact, as illustrated in Figure 3.

For clarity it may be understood that future reference to the cloth-gripping members may be taken to mean the frame members, together with their respective knives. The frame member 18 of the gripper member B is rigidly secured at one end to the horizontally reciprocable guide member, 22, while the frame member 17 of the upper gripper member is pivotally connected at 23 to the said reciprocating member, 22, by reason of which connections the gripping members may be reciprocated as a unit and the upper gripping member is permitted to rock rearwardly, for separating the gripping edges of the knives, 19 and 20. At the opposite end of the machine from that shown in Figure 3 there is employed a relatively short member, (not shown), which serves as a substitute for the forward end of the guide member, 22, which member and the forward end of the said reciprocating member, 22, are provided with trunnions as indicated at 25. These trunnions are journaled in bearing blocks slidably guided in suitable horizontal ways formed on the inner sides of the standards or end frames, 10, by which construction the gripping members are permitted to be rocked as a unit about the axes of said trunnions while being positively guided for horizontal reciprocation toward and away from the pressure rolls.

Figure 1:
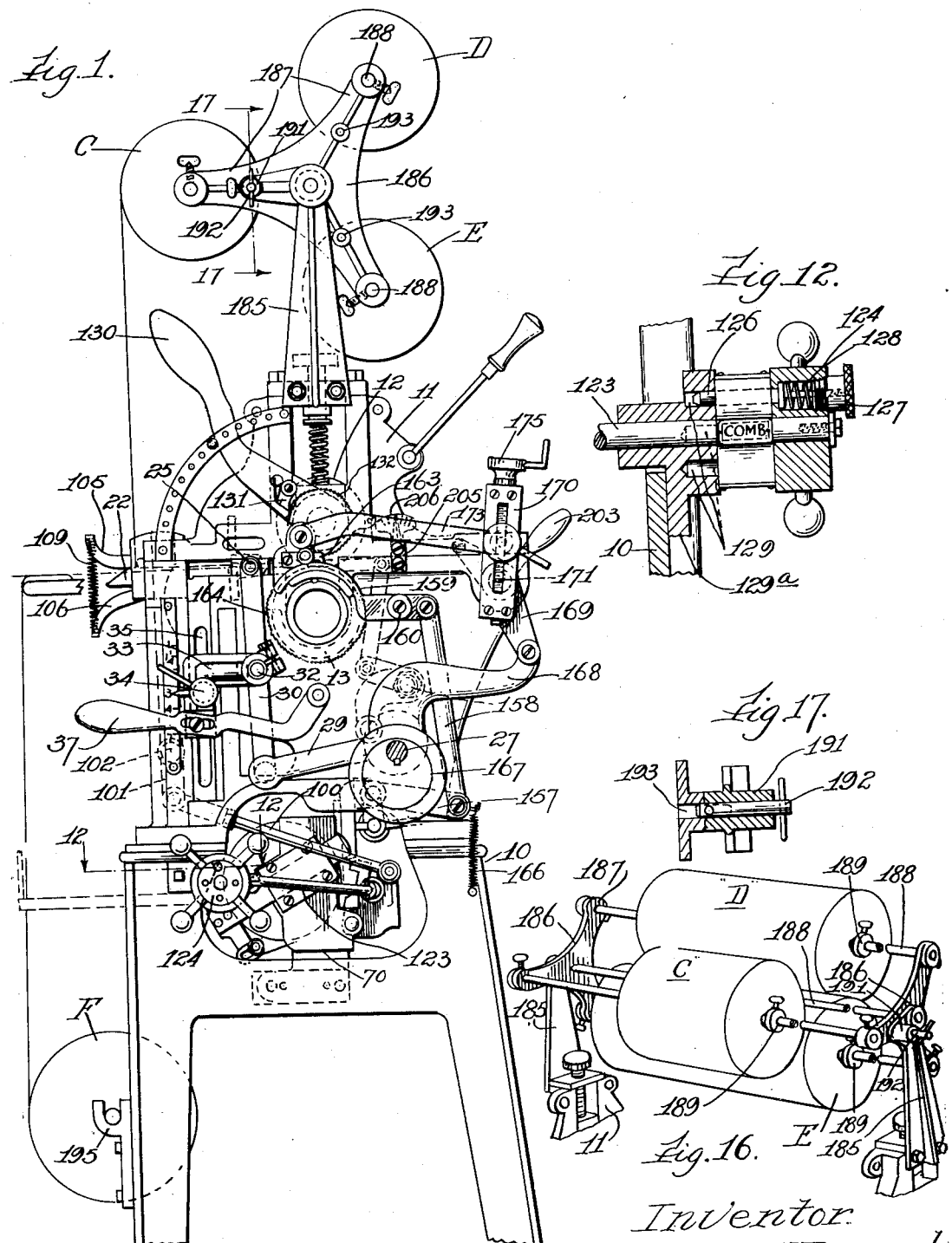
Figure 1 is an end elevation of a plaiting machine embodying the present invention.

Reciprocation is imparted to the cloth-gripping members from the main power shaft, indicated at 27, which extends longitudinally of the machine, and is provided with suitable drive connections to a motor (not shown). It may also be understood that this drive shaft is provided with a suitable clutch and hand wheel, (not shown), for the usual purpose of securing proper adjustment of the cloth and of the various operating elements in setting the machine preparatory to operation. At opposite ends of the power shaft outside of the end frames are provided eccentrics, 28, having connecting rods, 29, pivotally connected to the lower ends of upwardly extending levers, 30, whose upper ends engage the trunnions, 25, and serve to transmit motion from the eccentrics, 28, in a horizontal direction for reciprocating the cloth-gripping members toward and from the pressure rolls. In order to impart motion to the upper ends of the levers, 30, which in turn impart motion to the cloth-gripping members, there must be provided a fulcrum intermediate the pivotal ends of said levers, and as may be seen in the drawings, sliding fulcrums indicated at 32 are formed by the sliding bearings carried by brackets, 33, which are adjustably supported by clamping devices, 34, engaging in the vertical slots, 35, of the end frames, so as to permit raising or lowering of the bracket, for shifting the fulcrum, 32, and thus varying the length of stroke of the cloth-gripping members. For convenience the end frames are provided with suitable graduations such as shown in Figure 1, with which the brackets may be registered for locating the fulcrums 32 at positions which will produce a certain size plait corresponding to the length of stroke of the cloth-gripping members, caused by the particular location of the fulcrums, 32.

To assist in properly adjusting the sliding fulcrums 32, I preferably provide levers, 37, pivotally mounted on each of the end frames in a manner to permit engagement with the bottom of the brackets, 33, as seen in the drawings, so as to more conveniently control the adjustment. It may be understood that this adjustment of the sliding fulcrum which varies the length of stroke of the cloth-gripping members, controls the depth of the plait to be formed in the cloth or fabric.

Figure 2:
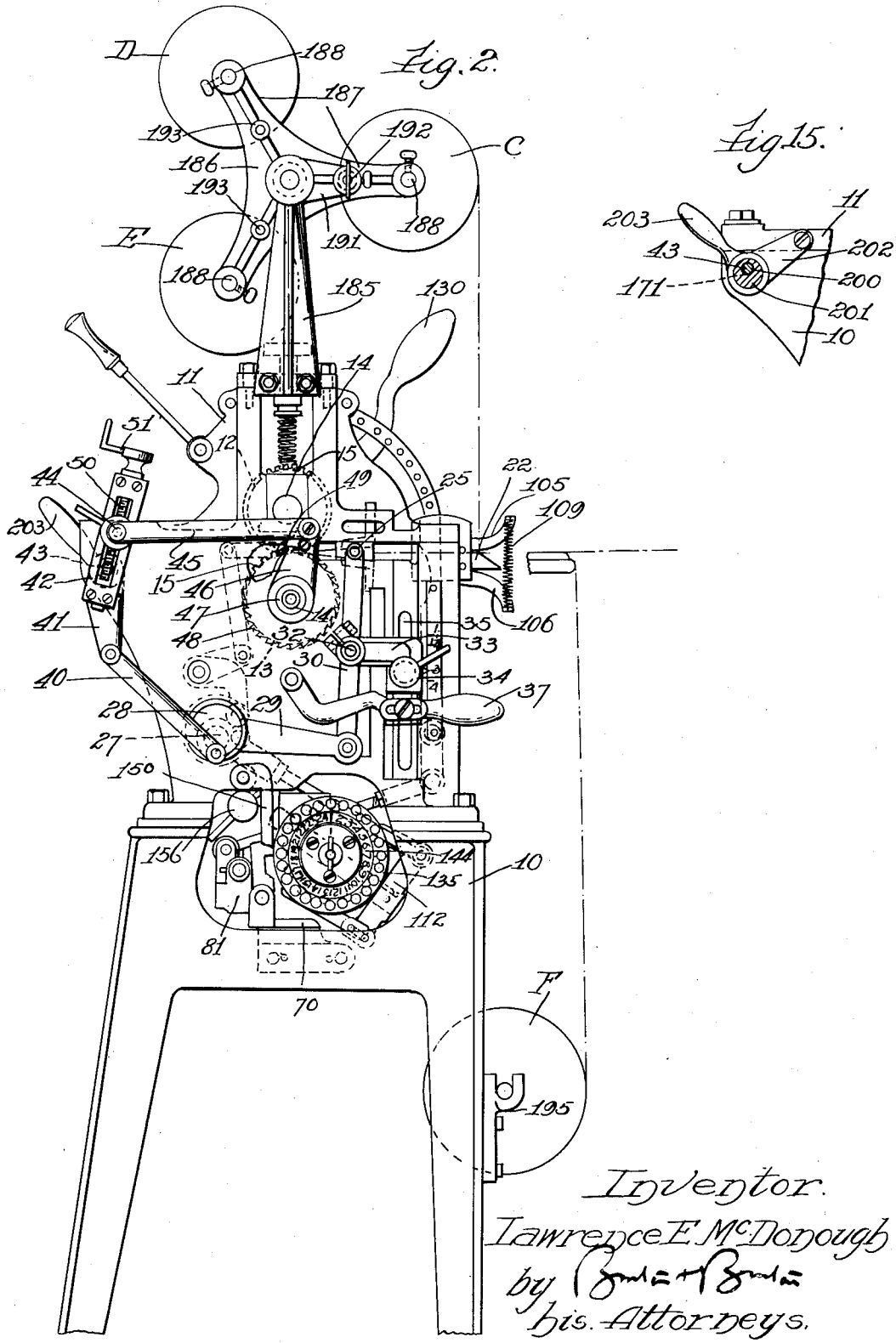
Figure 2 is an elevation of the opposite end of the machine.

In order that plaits may be formed in the cloth, it is necessary that the cloth be advanced through the pressure rolls in timed relation to the reciprocation of the cloth-gripping members; the mechanism for accomplishing this movement is preferably located at one end of the machine and includes a pitman, 40, connected to a crank pin on the adjacent eccentric, 28, (as seen in Figure 2), and pivotally connected at its upper end to the lug, 41, of the rocker member, 42, which in turn is pivoted at 43 to the end frame, 10. The rocker, 42, is provided with a trunnion support, 44, for a horizontally movable link, 45, the opposite end of which is pivotally connected to a yoke, 46, journaled on the hub, 47, of the ratchet wheel, 48; and mounted on the yoke member is a pawl, 49, for imparting rotation to the ratchet when the link, 45, is reciprocated in a rearward direction. The trunnion, 44, connected to the rear end of the link, 45, is adjustable vertically in the rocker, 42, by a screw, 50, controlled by the hand wheel, 51, by virtue of which the trunnion may be moved relative to the fixed pivot, 43, for varying the length of stroke of the link, 45, which in turn governs the speed of rotation of the pressure rolls for feeding the cloth therethrough. This adjustment controls the extent of over lay of the plaits and may be set at a position corresponding to a certain like adjustment of the sliding fulcrum, 32, for the link 30, which controls the length of stroke of the gripping members, A and B; or this adjustment of the feed of the rolls may be made so as to obtain scant plaiting of the cloth.

In order that the cloth-gripping members may function properly for gripping the cloth and advancing it forwardly into the bight of the rolls and then releasing the cloth for return movement, it is necessary that the gripping members, including the knives, 19 and 20, be separated in timed relation to the reciprocation of said gripping members. This is accomplished by rocking the upper gripping member about its pivot, 23, by controlled mechanism actuated by the main power shaft 27. On the main power shaft, 27, at the left hand end of the machine on the inner side of the end frame, as seen in Figure 3, is a cam, 55, which is designed with a camming surface, 55ª, so as to be effective only through a half revolution of said power shaft, and which is located for cooperation with the roller, 56, carried on the lower end of the lever, 57, pivoted at 58, to the inside of the end frame; the opposite end of the lever, 57, is arranged for engaging the lower end of the vertically sliding table, 60, which is guided for movement on the inside of the end frame and has its upper end formed with a relatively flat surface for engaging a roller, 61, journaled on the lower end of a curved link, 62, the opposite or upper end of which link is rigidly connected to the frame member, 17, of the upper cloth-gripping member A. When the effective camming surface of cam 55 engages the roller, 56, it imparts movement through the link, 57, and the sliding table, 60, in a manner to force the roller, 61, in an upward direction, thereby rocking the upper cloth-gripping member, A, rearwardly about its pivot, 23, and swinging the upper knife member, 19, upwardly out of gripping relation with the lower knife member, 20.

It is to be understood that this opening movement of the gripping members is commenced almost instantly after the cloth has been advanced thereby in loop form into the bight of the rolls, and by reason of the camming surface of the cam 55 being designed so as to be effective only during one-half revolution of the main shaft, the upper cloth-gripping member is maintained in its rearwardly tilted position, (against the reaction of spring pressure normally tending to close said gripping members), until the cloth-gripping members approach the rearward limit of their reciprocating movement, at which time the roller, 56, is again freed by the removal of the force exerted by the linkage, thus permitting the upper cloth-gripping member to rock downwardly so that its knife, 19, may come into gripping relation to the lower knife member, 20. The end of the lever, 57, in contact with the sliding table, 60, is preferably provided with an adjusting screw, 64, so as to insure accurate movement of the table in controlling the upper cloth-gripping member. A spring, 65, is connected adjacent the upper end of lever, 57, and to a transversely extending tie rod, 66, by means of which the adjusting screw, 64, is always maintained in contact with the lower end of the sliding table, 60, ready to impart motion for causing rocking of the upper member, A. A coil spring, 67, is connected at one end to the curved link, 62, adjacent its roller, 61, and at its opposite end to a bracket, 68, which is supported by the fixed frame member, 18, of the lower gripping member, and this spring normally tends to force the table, 60, in downward direction, and to rock the upper cloth-gripping member about its pivot, 23, into gripping relation with the lower member.

Figure 4:
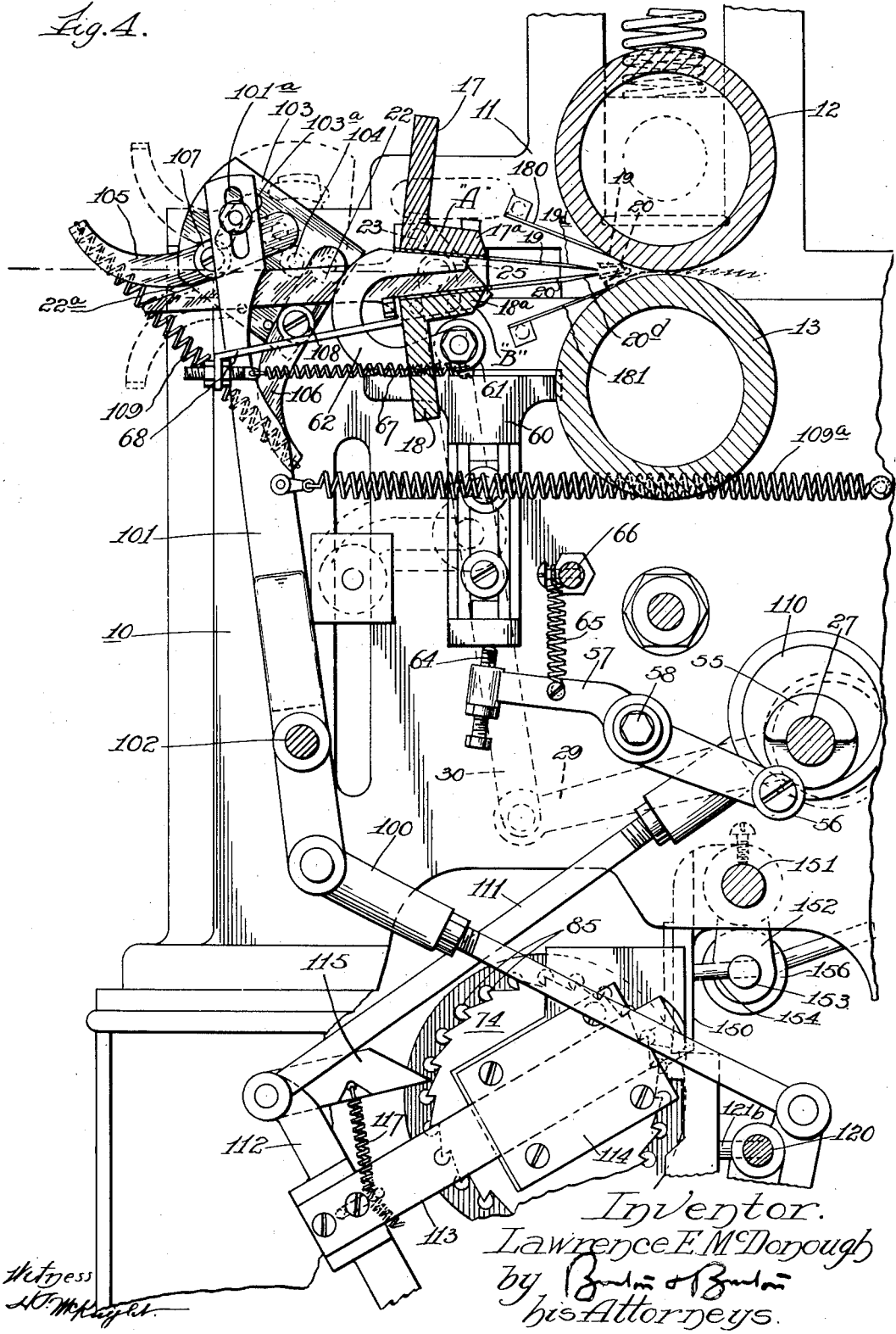
Figure 4 is a view similar to Figure 3, but showing the cloth-gripping members in position for forming reverse plaits; the alternation of the movements of the cloth-gripping members indicated by Figures 3 and 4 resulting in formation of box plaits.

Plaiting or creasing of the cloth is effected by advancing the cloth by means of the gripping members in loosely folded form into the bight of the rolls, and in order to produce this loop formation in the cloth, it is necessary to rock the cloth-gripping members as a unit in either upward or downward direction; and it may be understood that when the members are rocked in a downward direction so as to under-tuck the cloth to form plaits, such as indicated in Figure 3, the result is termed "side plaiting", while rocking the gripping members upwardly for over-tucking the cloth, as seen in Figure 4, produces "reverse" plaiting; the alternate combination of these two movements, i. e., over-tucking and under-tucking of the cloth, results in what is generally termed a "box" plait. This rocking movement is transmitted to the gripping members through the reciprocating frame member, 22, by linkage connected to a control device which will now be described.

The control device illustrated in the drawings represents certain refinements and improvements over the device shown in my aforesaid co-pending application Serial No. 328,476, and includes a bracket member, 70, which is secured to the inside of the standard at the left-hand end of the machine, and is provided with an upright bearing plate 71, to which is rigidly secured a horizontally extending stub, 72, on which is journaled for free rotation a drum, 73. Interposed between the drum and the bearing member, 71, is a ratchet, 74, rigidly secured to the drum by the pins, 75, so as to be rotatable with said drum as a unit. It may be mentioned here that this control device is constructed for producing "reverse", "box", or "combination" plaits, and when the device is not employed, the machine operates in a manner to produce "side" plaits by mechanism hereinafter described.

The drum is provided with three cams with which cooperate independently movable dogs, 77, 78 and 79, respectively, which are selectively movable into operative engagement with their respective cams, (see Figure 10). These dogs are mounted on the pivot pin, 80, which likewise is the pivotal connection between the yoke member, 81, and the bracket member, 70. It may be understood that the cam, 82, adjacent the ratchet, 75, which cooperates with the dog, 77, has its cam surface formed with a series of projections which cause rocking of the gripping members about the trunnions, 25, for over-tucking the cloth, as will hereinafter be seen. And the cam, 83, which registers with the central dog, 78, is also formed with a series of projections for rocking the gripping members about the trunnions, 25, but the projections are so arranged as to cause rocking of the gripping members in alternate directions successively for over-tucking and under-tucking to produce a "box" plait. To obtain this rocking action every alternate projection in the cam, 83, as compared to cam, 82, is omitted. The projections forming the contour of the cams, 82 and 83, may be formed in any suitable manner, and as herein shown, consist of transversely extending pins, 85, extending from a peripheral flange, 86, of the drum; it will be seen that only the alternate pins project through the flange, 86, so as to extend from both sides of the flange, while the remaining pins, which complete the contour of cam 82, terminate in said flange, 86.

A cam surface, 87, which is at the outer end of the series cooperates with the dog, 79, and is adjustable so as to effect rocking of the gripping members in a predetermined order for producing a desired plaiting combination. The contour of this cam, 87, is formed by a series of circularly arranged pins, 88, extending parallel to the axis of rotation of the drum and slidably movable in the flange, 89, of said drum for selectively varying the contour of the cam, thereby varying the resultant combination plait. These pins are all provided with peripheral grooves as indicated at 90, which register with a peripheral slot, 91, formed in said flange, 89. Circumscribing the pins is a coil spring, 92, yieldingly seating in the grooves of the pins for maintaining said pins in their inwardly projected position, as seen in Figure 10. It may be understood that this spring is also capable of exerting sufficient friction on the end portions of the pins when the same are retracted to their extended position, for yieldingly maintaining the pins in that position of adjustment. These pins for convenience in manipulating by the operator are formed with heads, 93, each having a stop shoulder 94, which is adapted to abut against the face of the flange, 89, or limiting the inward movement of the pin for forming the surface of the cam 87, while the opposite face of said shoulder, 94, is adapted to engage under the head of a screw, 95, set in the face of the drum for limiting the outward movement of the pin, in which position of the pin, a gap is produced in the contour of the cam 87. Arranged centrally within the circle of the pins, 88, is a disk, 96, containing numerals corresponding to the respective pins for facilitating setting up predetermined combinations.

The upper end of the rocking yoke, 81, is pivotally connected to a rod, 100, which in turn is pivotally connected to an upwardly extending lever, 101, which is fulcrumed at 102, on the pedestal or end frame 10, and the upper end of said lever, 101, is pivotally connected to a rocking plate, 103, which is pivoted at 104, to the end frame, 10. The rocking plate and the upper end of the lever, 101, are provided with slotted apertures, 101ª and 103ª, respectively, for accommodating adjustment of these two members. Pivotally mounted on the rocking plate, 103, are a pair of vertically spaced arms, 105 and 106, provided with rollers, 107 and 108, for engaging the upper and lower edges respectively of the guide member, 22, for the gripping members, (as seen in Figures 3 and 4). The outer ends of said arms, 105 and 106 are yieldingly connected together by a coil spring, 109. A coil spring 109ª is connected at one end to the standard 10, and at its other end to the lever 101, yieldingly tending to rock plate 103, forwardly to permit the knives to form the usual "side" plaits.

Mounted on the main drive shaft, 27, adjacent the lefthand end frame is an eccentric, 110, (Figures 3 and 4), having a connecting rod, 111, which is pivotally secured at its remote end to the transversely extending bar, 112, which in turn is secured to the outer end of a guide bar, 113. The guide bar is reciprocably movable radially of the axis of rotation of the drum, 73, in a bearing, 114, on the upright extension, 71, of the bracket, 70. Secured to the opposite ends of the transverse member, 112, are two pawls, 115 and 116, engaging the ratchet, 74, for imparting rotation to the drum. A spring, 117, connects said pawls together for holding them in operative relation with the ratchet. As will be apparent from the drawings, these pawls are so designed that in one direction of reciprocation of the guide bar, 113, one of the pawls imparts rotary movement to the ratchet, while reciprocatory movement of the guide bar in the opposite direction permits the other pawl to be brought into action for continuing the rotation of the ratchet in the same direction. It may be understood that the mechanism for rotating the drum is always functioning irrespective of whether or not any one of the three cams, 82, 83 or 87 are operatively engaged by their respective dogs, because the mechanism is so arranged that when none of these cams operate to transmit movement to the cloth gripping members, the gripping members by reason of their own unhampered reciprocatory movement are sufficient in themselves for effecting a rocking action which results in under-tucking of the cloth for forming "side" plaits.

For determining which, if any, of these cams is to be employed for imparting movement to the cloth gripping members for producing their corresponding forms of plaits, I provide a short, rotary shaft, 120, journaled in the yoke, 81, disposed parallel to the axis of rotation of the drum. This shaft carries three axially spaced pins, 121ª, 121ᵇ and 121ᶜ, which are also angularly spaced apart, and as herein shown, at substantially ninety degrees, so that upon rotation of the shaft, 120, only one of the pins at a given time will be caused to engage its correspondingly aligned dog for moving it into engagement with its cooperating cam. These pins being three in number operate the three dogs in successive order by rotational adjustment of the shaft, and when the shaft, 120, is so adjusted that no pin is in engagement with its dog, the control mechanism does not affect the motion of the gripping members, but said gripping members are permitted to be rocked and form "side" plaits in the manner mentioned above. It will be apparent that by merely rotating the shaft, 120, ninety degrees one of the pins will be brought into engagement with its dog for moving the same into operative relation with its corresponding cam surface on the drum, by reason of which the proper motion is transmitted through the linkage to the gripping members for forming plaits in a predetermined order.

For convenience in rotating the shaft, 120, the shaft is made relatively short and is connected by a universal coupling, 122, to a transversely extending operating shaft, 123, which extends through the opposite end frame, as seen in Figure 12, and carries at its extreme end a control wheel, 124, which is provided at ninety degree intervals with plates or other suitable means of identification to designate the position of adjustment of the shaft, 120, corresponding to a certain set up of the control device for imparting movement to the gripping members and producing a predetermined style of plait. To insure maintaining the shaft, 120, in a definite position of adjustment, I provide a suitable detent or locking mechanism which, as seen in Figure 12, consists of a plunger, 126, formed with a head, 127, and having a spring, 128, encompassing a portion of its shank and normally urging the pin in axial direction for holding it in locking engagement with one of the apertures, 129, formed in the bracket 129a on the end frame 10. When the control wheel is once set, it insures the operator against making incorrect or undesired forms of plaits, as it positively brings into action only the mechanism which will produce a form of plait corresponding to the indicated designation on the hand wheel.

It will be understood that when the shaft, 120, is rotated so as to bring the pin, 121c, into operative relation with its dog, 77, said dog is shifted into contact with the pins, 85, forming the surface of the cam, 82, and there will be imparted to the yoke member, 81, a rocking motion about its pivot, 80, which motion in turn will be transmitted through the rod, 100, and lever, 101, to the rocking plate, 103, for swinging the same about its pivot, 104, in timed relation to the reciprocatory movement of the cloth gripping members; the spring 109a being arranged to return the linkage in forward direction. As seen in Figure 4, the mechanism is shown in a position which it would assume when actuated by the cam, 82. Each time the dog, 77, rides off of the pins, 85, it releases the yoke permitting it to rock forwardly. This release of the linkage caused by the dog dropping into the space between projections 85 takes place during the rearward stroke of the gripping members. When the cloth-gripping members are returned to their rearward limit of movement, the linkage being released permits the rocking plate, 103, to be swung upwardly about its pivot, 104, and assume the position indicated in dotted lines in the drawings, at which position the cloth-gripping members are again closed to grip the cloth or fabric and again start in their forward travel toward the pressure rolls. As illustrated in Figure 4, the rear end of the guide bar, 22, is tapered off as indicated at 22a, so as to relieve part of the excess tension on the spring, 109, as the arms, 105 and 106, are forced apart by their rollers, 107 and 108, by reason of the rocking of the plate, 103.

As above mentioned, the cam, 83, is formed with alternate projections or pins so that the cloth-gripping members are permitted to make a complete reciprocation for forming a "side" plait in the usual manner and when the pin, 121b, is brought into contact with its dog, 78, and causes it to encounter a projection on a cam surface, 83, as the yoke, will be rocked for transmitting motion through the rod, 100, and lever, 101, for tilting the rocking plate rearwardly, and thus by another complete reciprocation of the cloth-gripping member, will form an over tuck or "reverse" plait. Thus this alternation of the "side" plait and "reverse" plait, as above mentioned, results in the formation of "box" plaits.

And when the shaft, 120, is adjusted so as to bring the pin, 121a, into engagement with its dog, 79, causing it to assume operative engagement with its cam, 87, the motion transmitted to the cloth-gripping members may be varied depending upon the particular arrangement of the pins 88 which determine the contour of the camming surface. Thus a certain setting of pins will produce a certain contour of camming surface which will result in imparting a predetermined sequence of motions to the cloth-gripping members for forming a required plaiting combination.

Where it is desired to quickly advance through the pressure rolls certain portions of the cloth that are not to be plaited, there may be provided a manually operable lever, shown at 130, which carries a pawl, 131, yieldingly urged into engagement with a ratchet, 132, mounted on a trunnion of the upper pressure roll. By swinging the lever in a downward direction, the rolls 12 and 13, are simultaneously rotated by the intermeshing gearing above referred to for advancing the cloth therethrough. Heretofore when it was desirable to leave an intermediate portion of the goods unplaited, the operator had to stop the machine and manipulate a device equivalent to the hand lever, 130, so as to advance the unplaited cloth through the rolls. This entailed a waste of time, especially where it was desired to form plaits in a piece of goods at predetermined intervals. At the best, such operation produced only approximately accurate results. If the operator endeavored to manipulate this manual spacing device while the machine was in operation, he would be almost certain to cause inaccurate spacing of the plaits. To obviate this difficulty and insure accurate spacing, I have provided an automatic mechanism which is selectively adjustable.

This automatic mechanism consists of a drum, 135, which is provided with a short hub portion, 135a, journaled on the outer end of the fixed stub shaft 72. The end of the hub, 135a, and the adjacent side of the drum, 73, are rotatively interconnected by one or more dowel pins, 136. This device is quite similar to the construction for producing the combination plaits. Arranged in a circle on the outer face of the drum, 135, are a plurality of pins, 137, extending into said drum, and provided at their outer ends with heads, 138, for manipulation. The extreme inner ends of the pins when fully inserted (as seen in Figure 10) form projections or "bumps" in the camming surface of the cam 139, and when a pin is retracted or pulled outwardly, it leaves a gap in the contour of the cam. The heads of the pins are formed with flanges, 138a, which are adapted to abut against the face of the drum, 135, for limiting their inward movement, and adapted to engage the under sides of headed projections, 140, secured in the face of the drum for limiting the outward movement of the pins. The drum is formed with a peripheral groove, 141, exposing an intermediate portion of the pins. The pins are all provided with peripheral grooves, 142, which register with the groove 141 in the drum when they are fully inserted. Seated in the grooves 142 is a coil spring, 143, for yieldingly holding said pins at said inward limit of adjustment, and also arranged for engaging the ends of the pins (when extended) for yieldingly holding them at their outward limit of movement.

An outer dial, 144, is mounted on the face of the drum, 135, within the circularly arranged series of pins, and is provided with numerals corresponding to the respective pins to facilitate obtaining a predetermined "set up" for making a desired plaiting arrangement. The outer end of the stub shaft, 72, is provided with a screw, 145, having a wing nut, 146, with a coil spring, 147, interposed between the nut and a plate, 148, for yieldingly transmitting pressure to the plate, 148, to hold the drum, 135, in operative engagement with the drum, 73. Mounted for cooperation with the cam surface of the drum, 135, is a dog, 150, loosely mounted on a rock shaft, 151, which extends transversely of the machine and is journaled in the end frames, 10; and rigidly mounted on the rock shaft adjacent said dog is a depending bracket, 152, in which is journaled a stud, 153, carrying a laterally projecting pin, 154, disposed in the plane of the dog and adapted when rotated by the stud to engage said dog and moving it forwardly about the axis of the rock shaft into the path of engagement of the cam surface of the drum, 135. A coil spring, 155, connects the bracket and the dog, and tends to yieldingly hold said dog out of operative position, as indicated in dotted lines in Figure 11. The outer end of the stud, 153, is provided with an operating knob, 156, for convenient manipulation at will.

The end of the rock shaft, 151, remote from the selector device is provided with a crank arm, 157, (as seen in Figures 1 and 7) which is pivotally connected to an upwardly extending link, 158, which in turn is pivotally connected to a cam track, 159, fulcrumed to the end frame at 160. Secured on the outer end of the trunnions at the right hand end of the lower pressure roll is a ratchet, 161, on whose hub is loosely journaled a yoke member, 162, having a lug, 162ª, to which is pivotally connected a pawl, 163, for engaging the ratchet and carrying a laterally projecting roller, 164, adapted to be engaged with the cam track, 159. A coil spring, 165, is connected to said pawl for normally urging it into engagement with said ratchet, 161, and a coil spring, 166, is connected to the outer end of the crank arm, 157, for yieldingly exerting pressure through the link, 158, swinging the cam track, 159, about its fulcrum, thereby forcing the roller upwardly and raising the pawl, 163, out of operative engagement with its ratchet, as seen in Figure 6. Mounted on the main drive shaft, 27, at the same end of the machine is an eccentric, 167, having a connecting rod, 168, pivotally connected to the lower end of a lug, 169, of a rocker, 170, which is pivotally mounted at 171, to the end frame in the same manner as the rocker, 42. The rocker is provided with an adjustable trunnion, 172, to which is connected the end of a link, 173, the other end of which link is connected to the extension, 162ª, of the yoke, 162, for imparting reciprocatory movement to the pawl, 163, for rotating the ratchet at selected intervals.

As may be seen in Figure 5, the rocker, 170, is provided with an adjusting screw, 174, and a head, 175, by means of which the trunnion, 172, may be moved relatively to the fixed pivot, 171, for varying the length of stroke of the lever, 173, and accordingly varying the auxiliary spacing feed of the pressure rolls when permitted to operate. It will be apparent that when the handle, 156, is at inoperative position with the dog 150 out of engagement with its cam, (as indicated in dotted lines in Figure 11), the spring, 166, through the link, 158, and cam track, 159, supports the pawl out of engagement with its ratchet so that any reciprocatory movement of the pawl produced through the link, 173, is ineffective for imparting rotation to the pressure rolls. It may be understood that this automatic spacing mechanism is more or less of an auxiliary device employed when it is desired to make relatively large plaits of any form, as above described, and it is adjustable so that it will effect spacing of the plaits a predetermined distance apart or in any predetermined arrangement; this spacing being accomplished merely by the setting of the pins, 137. By this particular mechanism the operator of a machine of this character is relieved of all the worry and thought in connection with forming a predetermined plaiting arrangement after the pins have been once adjusted to form the necessary contour of the camming surface, and the trunnion in the rocker, 170, is also adjusted so as to produce the desired distance between plaits.

As illustrated in Figures 13 and 14, the cloth-gripping knives, which are formed of relatively thin sheet metal stock are provided at their longitudinal edges (that cooperate in the gripping of the cloth) with a series of transversely extending spring fingers, 19ª and 20ª, formed by cutting kerfs, 19ᵇ and 20ᵇ, in said knives, and also forming apertures, 19ᶜ and 20ᶜ, registering with the respective kerfs so as to produce the width of the spring fingers at their connection to the body of the knives for insuring a more springy action. These spring fingers of the respective gripping knives are located preferably in registration with each other so that in engaging an excess thickness of cloth (such as the hem) the cooperating spring fingers will be forced to yield to accommodate this excess thickness, while permitting the remaining fingers to firmly grip, substantially the entire remaining width of the cloth. This construction is particularly advantageous, in that it prevents undesirable creasing which frequently results from the fact that the knives or gripping members do not engage or firmly secure the cloth throughout its entire width. The upper and lower surfaces, 19ᵈ and 20ᵈ, respectively, of these knife members are beveled so as to provide clearance and permit their being advanced for feeding the cloth into the bight of the rolls with least obstruction by contact with the rolls.

It may be here mentioned that in forming the plaits by advancing the cloth in loosely looped form into the rolls, the knives or gripping members after gripping the cloth are caused to engage either the upper or lower guard plates, 180, 181, respectively, depending upon whether the gripping members are being rocked to form over-tuck or under-tuck plaits which correspond to the "side" or "reverse" plaits, and as the knives advance the cloth slidably over the guard plates, the knives encounter either the upper or lower roll (as indicated in dotted lines in Figures 3 and 4) depending on the conditions aforesaid and are thereby guided into the bight of the rolls.

In plaiting work produced by machines of this general character, it has been found necessary in order to effect a saving in the use of paper which is employed for this purpose to use paper of a width which will reduce the waste to a minimum, and this necessitates carrying a number of rolls of papers of differing widths. In machines heretofore constructed, a considerable loss of time was entailed in changing the rolls of paper, not to mention the inconvenience involved. To overcome this difficulty I have devised an improved construction. Referring to Figure 16, of the drawings, the construction for supporting the rolls of paper includes end brackets, 185, which are rigidly secured to the sliding supplemental end frames, 11; and pivotally journaled in the upper ends of each of said brackets, is a carrier unit holding a plurality of rolls of paper of different widths. This carrier is composed of a pair of end members or spiders, 186, journaled to the brackets and formed with outwardly extending arms, 187, which are aligned with each other and are connected together by suitable tie rods, 188, on which are supported the rolls of paper, as indicated at C, D and E, respectively.

Slidably mounted on each rod, 188, are adjustable end blocks, 189, which are made conical to engage the central opening of the roll of paper, and thereby fix the same on the rod, 188, in some definite position. One of the brackets, 185, has an offset boss, 191, carrying a detent in the form of a plunger or pin, 192, adapted to be projected into any of the apertures, 193, formed in the spider arms for locking the carrier to the end brackets. By this arrangement any selected roll of paper may be quickly brought into operative position merely by releasing the detent pin, 192, and rotating the carrier to the desired position, as seen in Figure 1.

In machines of this character it is usually desirable to provide a sheet of paper on opposite sides of the cloth during the plaiting operation, and as shown in the drawings, rolls C, D or E may be arranged for training the paper from one of them to serve as the upper layer. A roll of paper, indicated at F, is supported in bearing brackets, 195, on the front of the frame, and is trained upwardly over suitable guides into contact with the under side of the fabric or cloth, as it is fed into the machine. This paper which is of relatively light weight serves as a protection for the cloth during the plaiting operation, as well as during subsequent handling, and also tends to assist the creasing of the cloth in the formation of plaits, and for maintaining the same in the cloth.

At opposite ends of the main frame are journaled pivot pins, 200, which serve as the pivots for the rockers, 42 and 170, as seen in Figures 2 and 15. Extending transversely of the machine is a rock shaft, 201, which is provided with eccentric bores at its ends for journaling on the pins, 200, and loosely mounted on said rock shaft at opposite ends adjacent the end frames, 10, are a pair of inclined arms, 202, the upper ends of which are pivotally mounted to the sliding supplemental end frames, 11, as seen in Figure 15. Mounted on the rock shaft intermediate the ends at a convenient position is a hand lever, 203, which is adapted to be swung fore-and-aft for shifting the sliding end frame, by which the upper pressure roll is shifted for varying its position over the lower roll. To insure proper positioning of the sliding end frames and the upper roll, I supply an indicator, 205, on one of the end frames with which registers a graduated dial, 206, on the sliding frame, 11, as seen in Figure 1, for indicating the desired position of adjustment or relation of the pressure rolls for operating under certain conditions. This adjustment is primarily intended to accommodate variations in thickness of the cloth or fabric to be plaited, and such adjustment should preferably be made by the operator preparatory to commencing the operation.

I claim:

1. In a plaiting machine, a pair of reciprocating cloth gripping members, means for actuating said members; and control means including a drum rotatable in timed relation to said reciprocating members and having an adjustable camming surface, a normally inoperative actuating dog disposed adjacent said adjustable camming surface, manually operable means for shifting said dog into contact with said surface, the adjustable camming surface including a series of pins disposed parallel to and concentrically of the axis of rotation of the drum and selectively shiftable in axial direction into or out of position for engagement with the dog for imparting a certain sequence of movements to the cloth gripping members in producing a desired combination of plaits in the cloth, said pins each being formed with a head disposed for manipulation in axially shifting the pin, said heads acting as stops abutting against a transverse surface of the drum to limit the inward movement of said pins, and means on the drum, engageable with said heads of the pins for limiting their movement in the opposite direction.

2. In a plaiting machine for producing a variety of plaits, a pair of reciprocating cloth gripping members, means for actuating said members, selective means for instantaneously changing from one type of plait to another, said selective means including a support, separate cams for reverse plaits, box plaits and combination plaits, follower means for the cams including a rocking frame carried on the support, separate dogs for each of said cams carried on said frame, said dogs normally being disposed out of engagement with their respective cams, and selective means for shifting any one of said dogs into cooperating engagement with its cam.

3. In a plaiting machine for producing a variety of plaits, a pair of reciprocating cloth gripping members, means for actuating said members, selective means for instantaneously changing from one type of plait to another, said selective means including a support, separate cams for reverse plaits, box plaits, and combination plaits, follower means for the cams including a rocking frame on the support, and a separate dog to cooperate with each cam, carried on said frame, means for imparting rotation to the cams, including a ratchet associated therewith, a guide bar reciprocable in the support, a cross bar extending transversely of said guide bar, a pair of pawls carried by the cross bar adapted for engaging opposite sides of the ratchet, and a pitman connected to the cross bar for reciprocably moving both of said pawls together toward and away from the axis of the ratchet for rotating said cams.

4. In a plaiting machine adapted for producing a variety of plaits, a pair of reciprocating cloth gripping members, means for actuating said members, and selectively adjustable means for instantaneously changing from one type of plait to another, including a support, separate cams for forming different types of plaits, follower means for the cams comprising a frame pivotally mounted on the support, and a separate dog for each cam pivotally carried by the frame, said dogs normally being out of operative relation to the cams, and a control shaft journaled in the frame, and being provided with projections positioned for moving the respective dogs into operative engagement with their cooperating cams, said projections being angularly related to each other, so that only a selected dog will be moved into operative position for a given rotative adjustment of the shaft.

5. In the construction defined in claim 4, said projections being located substantially 90 degrees apart, and means associated with the shaft for locking it in any selected position of rotative adjustment.

6. In the construction defined in claim 4, means for maintaining said control shaft in a desired position of adjustment.

7. In the construction defined in claim 4, an operating member on said shaft, and detent means associated with said member for locking said shaft in any position of adjustment.

8. In the construction defined in claim 4, an operating member on said shaft, and detent means associated with said member for locking said shaft in any position of adjustment, said means including a control member having an exterior surface provided with markings indicating positions of adjustment of said selectively adjustable means corresponding to the particular type of plait being produced.

9. In a plaiting machine having end frames and a pair of cooperating pressure rolls carried thereby, feeding means for rotating the rolls, a pair of reciprocating cloth gripping members for advancing the cloth in looped form into the bight of the rolls, means for moving said members in timed relation to the feeding means, and auxiliary feeding means operable at will for automatically advancing the cloth through the rolls at a speed in excess of normal feeding speed for obtaining a predetermined spacing of plaits in the cloth, said auxiliary feeding means including a ratchet associated with one of said rolls, a yoke journaled for rotation about the axis of the ratchet, a pawl carried on the yoke and normally tending to engage the ratchet, linkage connected to the yoke for oscillating the pawl, a roller supported on the pawl and positioned to extend laterally beyond the ratchet, an arcuate cam track cooperating with the roller and pivotally mounted on the frame, and means selectively adjustable at will for imparting movement to said cam track at predetermined intervals for swinging said pawl upwardly out of engagement with the ratchet.

10. In a plaiting machine having end frames and a pair of cooperating pressure rolls carried thereby, feeding means for rotating the rolls, a pair of reciprocating cloth gripping members for advancing the cloth in looped form into the bight of the rolls, means for moving said members in timed relation to the feeding means, and auxiliary feeding means operable at will for automatically advancing the cloth through the rolls at a speed in excess of normal feeding speed for obtaining a predetermined spacing of plaits in the cloth, said auxiliary feeding means including a ratchet associated with one of said rolls, a yoke journaled for rotation about the axis of the ratchet, a pawl carried on the yoke and normally tending to engage the ratchet, linkage connected to the yoke for oscillating the pawl, a roller supported on the pawl and positioned to extend laterally beyond the ratchet, an arcuate cam track cooperating with the roller and pivotally mounted on the frame, and means selectively adjustable at will for imparting movement to said cam track at predetermined intervals for swinging said pawl upwardly out of engagement with the ratchet, said means including a rotatable drum having a camming surface, a dog movable into operable relation with the camming surface, linkage connecting the dog and cam track, said cam surface of the drum being selectively adjustable for imparting movement to the cam track for rendering the auxiliary feeding means inoperative at certain predetermined intervals for obtaining a desired plaiting arrangement.

11. In the construction defined in claim 10, spring means connected to the linkage and arranged for yieldingly maintaining the cam track in contact with the roller for supporting the pawl out of engagement with the ratchet.

12. In the construction defined in claim 10, spring means normally tending to hold the dog out of operative engagement with the camming surface, and means for positively locking said dog in operable position against the reaction of the spring.

13. In a plaiting machine having a pair of end frames, supplemental supporting frames slidably carried on the end frames, a pair of cooperating pressure rolls mounted in vertically spaced relation, one in the end frames, and the other in the supplemental supporting frames, cloth gripping members mounted for reciprocating movement for advancing the cloth in looped form into the bight of the rolls for creasing, and manually controlled means for shifting the supplemental supporting frames with the upper roll for varying the relation of the axes of said rolls.

LAWRENCE E. McDONOUGH.